United States Patent [19]

Lopez et al.

[11] Patent Number: 4,836,570
[45] Date of Patent: Jun. 6, 1989

[54] TRAILER HITCH

[76] Inventors: Alfred G. Lopez, 2906 Darwin, San Antonio, Tex. 78228; Arthur F. Lopez, 1739 Sacramento, San Antonio, Tex. 78201

[21] Appl. No.: 178,656
[22] Filed: Apr. 7, 1988
[51] Int. Cl.$^4$ .......................... B60D 1/06; B60D 1/12
[52] U.S. Cl. ........................................ 280/507; 70/237
[58] Field of Search .............. 280/507, 511, 512, 513; 70/237, 258

[56] References Cited

U.S. PATENT DOCUMENTS 4,032,171  6/1977  Allen .................................... 280/507
4,417,748 11/1983  Dortch ................................. 280/511
4,459,832  7/1984  Avera .................................. 280/507
4,577,884  3/1986  Harris .................................. 280/507

Primary Examiner—John A. Pekar
Attorney, Agent, or Firm—John R. Merkling

[57] ABSTRACT

An apparatus for preventing unauthorized intentional or accidental uncoupling of a trailer from a towed vehicle. A tow ball characterized by a flared shoulder is mounted on a tow bar. A bushing spaces the shoulder away from the tow bar and provides a cylindrical support for a bracket. The bracket is free to rotate about the bushing. A cap attached to the bracket prevents disengagement of the trailer from the towing vehicle.

13 Claims, 1 Drawing Sheet

TRAILER HITCH

BACKGROUND OF THE INVENTION

Field of the Invention

The present invention relates generally to trailer hitches of a type normally used on personal motor vehicles for towing such items as boat trailers, utility trailers, or camping trailers of various types.

SUMMARY OF THE INVENTION

The invention comprises apparatus for preventing unauthorized intentional uncoupling or accidental uncoupling of a trailer from a towing vehicle. A frame surrounding a towing ball prevents a yoke of a trailer from disengaging from the ball. The frame comprises two interlocking U-shaped brackets which are locked together with pins. The trailer ball is characterized by a standard metal ball mounted on a shank, the shank having an enlarged shoulder and a threaded shaft for receiving a lockwasher and nut. A bushing slides over the threaded shaft and effectively spaces the shoulder of the trailer ball away from a towing plate mounted on a towing vehicle. A hole bored in the lower U-bracket rotatably engages the outside of the bushing, whereby the lower angle bracket can rotate around the threaded shaft. The trailer hitch locking system thus provided is laterally stable while permitting a full range of articulation by a towed trailer hitched to a towing ball.

With the foregoing in mind, it is a primary object of the present invention to provide a trailer hitch which inhibits unauthorized intentional or accidental disengagement of a trailer from a towing vehicle.

It is a further object of the present invention to provide such a towing hitch having a wide laterally rotation to prevent binding between a towing vehicle and trailer during turns.

A further important object of the present invention is to provide an anti-disengagement trailer hitch with good lateral stability.

These and other important objects and features of the present invention will be evident from the following description, taken with reference to the accompanying drawings.

DETAILED DESCRIPTION OF THE ILLUSTRATED EMBODIMENT

Figure 1:
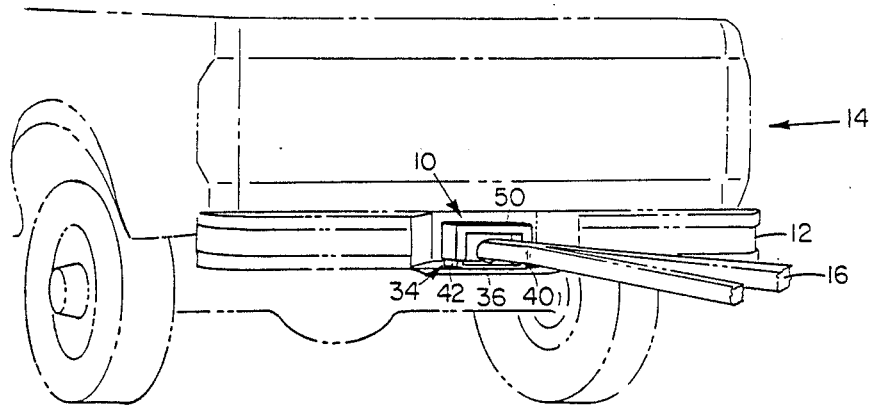
FIG. 1 is a perspective drawing of an improved trailer hitch in accordance with the present invention, affixed to a rear bumper of a pick-up truck.

Reference if now made to the drawings wherein like numerals are used to designate like parts throughout. FIG. 1 discloses a trailer hitch, generally designated 10, according to the present invention, according to the present invention, mounted on a rear bumper 12 of a pick-up truck 14. A tow bar 16, such as might be used on a small boat, utility or camping trailer, is shown attached to the trailer hitch 10.

Figure 2:
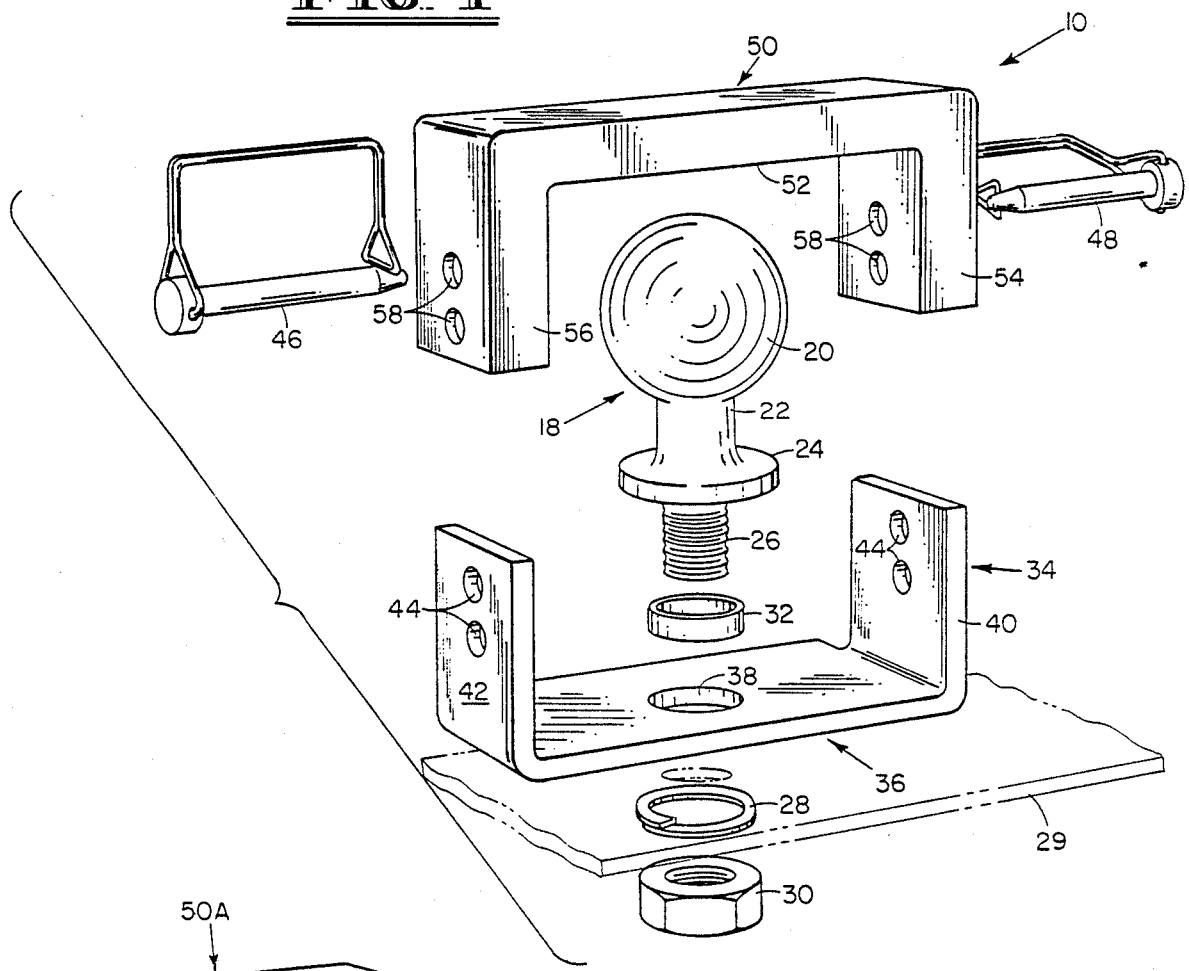
FIG. 2 is an exploded perspective drawing of an improved trailer hitch in accordance with the present invention.

As shown in FIG. 2, the trailer hitch 10 comprises a conventional tow ball, designated 18, characterized by a metal ball 20 mounted on a shank 22. The shank 22 terminates in an enlarged, generally flared shoulder 24. Concentric with the shank 22, there is a threaded shaft 26 for mounting the tow ball 18 to a tow plate 29 on a vehicle 14. The threaded shaft 26 is adapted to receive a lockwasher 28 and a nut 30 in a conventional manner. A bushing 32 fits over the threaded shaft 26 in such a manner as to be between the shoulder 24 and the tow plate 28. A lower angle bracket 34 comprises a bottom plate 36 having a hole 38 sized to rotatably engage the bushing 32. When the trailer ball 18 is mounted on a vehicle 14, the bushing 32 effectively spaces the shoulder 24 away from the tow plate 28 permitting the angle bracket 34 to be rotated axially about the bushing 32. Because the angle bracket 34 does not need to pass over the shoulder 24, the hole 38 can be relatively small, thereby decreasing the possibility that the angle bracket 34 would fail in the vicinity of the hole 38. Moreover, the placement of the angle bracket 34 between the shoulder 24 of the trailer ball 18 and the tow plate 29 limits side ways rocking or vibration in the trailer hitch.

The angle bracket 34 further comprises a right riser 40 and a left riser 42, substantially at right angles to the base plate 36 and in spaced planar relationship to each other. The risers 40, 42 are provided with a plurality of locking holes 44 which are sized to receive pins 46, 48.

The trailer hitch 10 further comprises a cap 50. In the illustrated embodiment, the cap 50 comprises rectangular cross-section steel tubing having a top section 52, a right leg 54 and a left leg 56, the legs 54, 56 being at substantially right angles to the top section 52 and being in spaced planar relationship to each other. The legs 54, 56 are sized to slidingly engage the risers 40, 42. Each leg 54, 56 is provided with a plurality of holes 58 sized to receive the pins 46, 48 and positioned to align with the holes 44 in the risers 40, 42. In the illustrated embodiment, the bottom plate 36 and the top section 52 can be spaced at selected heights away from each other by selecting different holes 44, 58 to contemporaneously engage the pins 46, 48.

In the illustration, the pins 46, 48 are shown as self-locking pins. Clearly, other forms of pins, such as alternative pin 60 or a pad lock such as padlock 62 or other locking device could be used without departing from the spirit or scope of the present invention.

Figure 3:
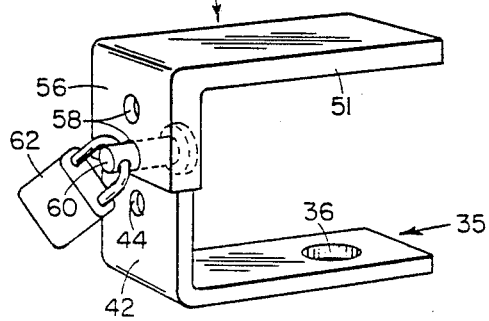
FIG. 3 is a perspective drawing of an alternative embodiment of interlocking brackets, comprising a part of a hitch in accordance with the present invention.

Reference is now made to FIG. 3 wherein an alternative embodiment for the cap 50 and the angle bracket 36 of the present invention is disclosed. An alternative angle bracket 35 and an alternative cap 51 are similar in all respects to the cap 34 and cap 50 as described above with the exception that the alternative angle bracket 35 has only one riser 42 and the alternative cap 51 has only one leg 56.

The invention may be embodied in other specific forms without departing from the spirit or essential characteristics thereof. The present embodiment is therefore considered in all respects to be illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters of Patent is:

1. An apparatus for use with a ball and socket type coupling as may be used in a coupling between a tongue of a trailer and a tow plate of a towing vehicle, comprising
- a tow ball characterized by a ball, a shank, a shoulder, a threaded shaft and a nut therefor,
- a bushing interposed between the shoulder and the tow plate,
- bracket means having a central bore through which rests the bushing so that said bracket means will rotate freely about the bushing in conjunction with the trailer tongue,
- the bushing further comprising means for retaining the shoulder and the tow plate in spaced relation to each other for retaining a part of the bracket means between the shoulder and the tow plate,
- cap means placed over the trailer tongue and removably affixed to said bracket means so that when the cap means is coupled to said bracket means a ball socket of the trailer tongue cannot become disengaged from the ball of the tow ball and said cap means will rotate about said tow ball in unison with the bracket means.

2. An apparatus according to claim 1 wherein the bracket means further comprise
- a base plate containing the central bore and being substantially coplanar with an upper surface of said tow bar,
- at least one riser affixed to an end of said base plate, and
- means attached to said riser for securing the cap means thereto.

3. An apparatus according to claim 2 wherein the cap means further comprise
- a top section,
- at least one leg attached to an end of said top section, and
- means for attaching the cap means to the at least one riser.

4. An apparatus according to claim 3 further comprising means for securing the bracket means and the cap means in fixed spacial relationship to each other and wherein the cap securing means comprise at least one bore for receiving the securing means and wherein the cap attaching means comprise at comprise at least one bore for receiving the securing means.

5. An apparatus according to claim 4 wherein the at least one riser further comprises two risers and wherein the at least one leg further comprises two legs.

6. An apparatus according to claim 5 wherein each riser slidingly engaged a leg.

7. An apparatus according to claim 6 wherein the legs are affixed to the top section at substantially right angles and wherein the risers are affixed to the base plate at substantially right angles.

8. An apparatus according to claim 4 whereon the securing means comprise at least one pin.

9. An apparatus according to claim 8 wherein the securing means further comprise at least one lock.

10. An apparatus for use with a ball and socket type coupling as may be used in a coupling between a tongue of a trailer and a tow plate of a towing vehicle, comprising
- a tow ball characterized by a ball, a shank, a shoulder, a threaded shaft and a nut therefor,
- bracket means having a central bore through which rests the threaded shaft, the bracket means further comprising
- a base plate containing the central bore and being substantially coplanar with an upper surface of said tow plate,
- at least two risers affixed to opposing ends of said base plate, and means attached to said risers for securing cap means thereto,
- the cap means being placed over the trailer tongue and removably affixed to said bracket means so that when the cap means is coupled to said bracket means a ball and socket of the trailer tongue cannot become disengaged from the ball of the tow ball, the cap means further comprising
- a top section,
- at least two legs attached to ends of said top section, wherein each riser slidingly engages a leg.

11. An apparatus according to claim 9 wherein the legs are affixed to the top section at substantially right angles and wherein the risers are affixed to the base plate at substantially right angles.

12. An apparatus according to claim 11 whereon the securing means comprise at least one pin.

13. An apparatus according to claim 12 wherein the securing means further comprise at least one lock.

* * * * *